UNITED STATES PATENT OFFICE.

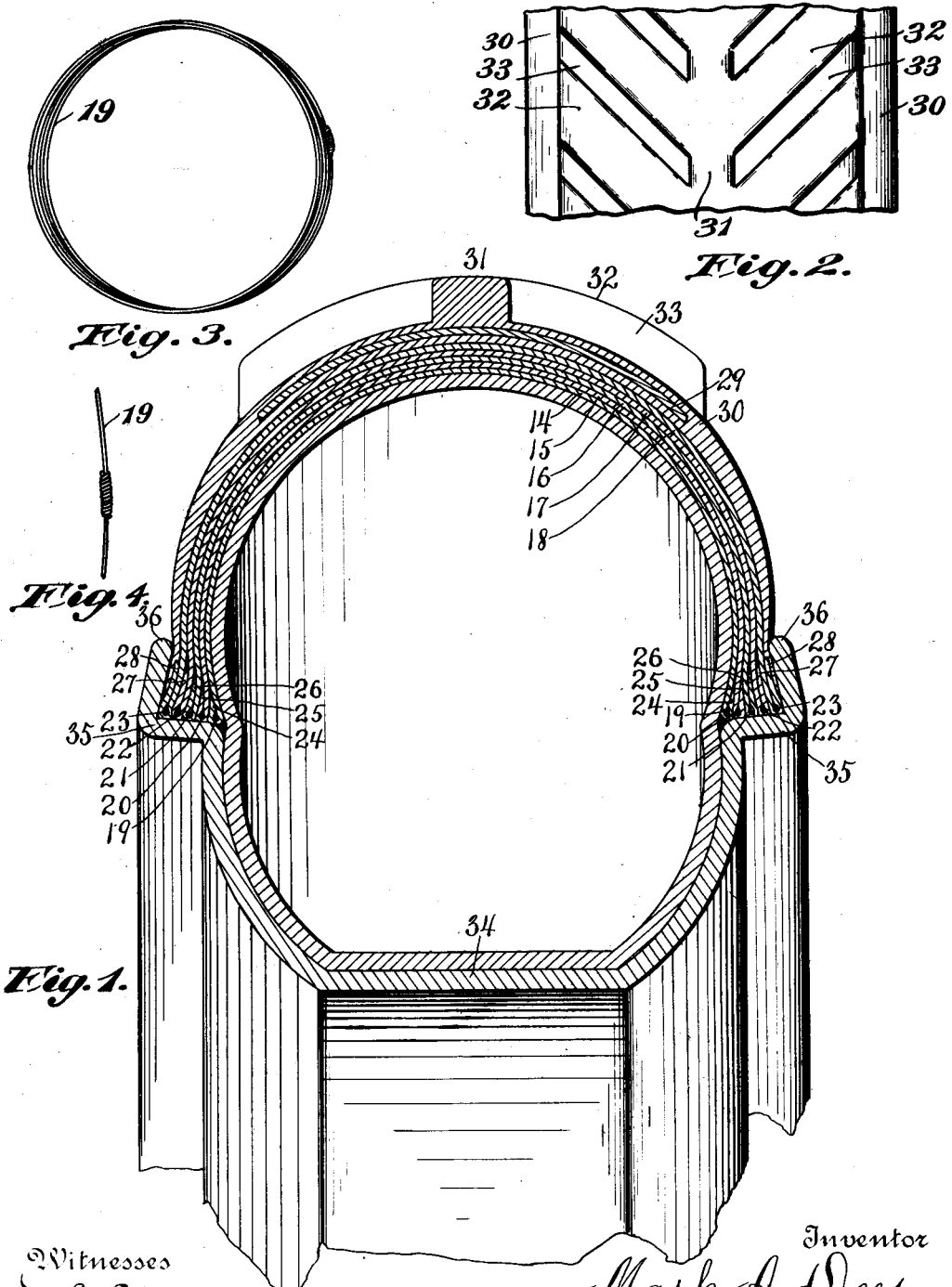

MARK A. DEES, OF LUBBOCK, TEXAS.

RUBBERIZED FABRIC AND RUBBER TIRE.

1,130,578.  Specification of Letters Patent.  Patented Mar. 2, 1915.

Application filed April 4, 1914. Serial No. 829,522.

*To all whom it may concern:*

Be it known that I, MARK A. DEES, a citizen of the United States of America, and a resident of Lubbock, in the county of Lubbock and State of Texas, have invented certain new and useful Improvements in Rubberized Fabric and Rubber Tires, of which the following is a description, reference being had to the accompanying drawings, forming a part of this specification.

My invention relates to rubberized fabric and rubber tires for use on vehicle and other wheels.

My improvement consists in a tire constructed of a rubberized fabric and rubber outer part, comprising a plurality of plies of rubberized fabric and rubber, generally three or more plies of the former, the number of plies varying with the style or size of the tire to be constructed, the assembled plies being covered with a reinforcement or sheath of rubber molded with a tread in any well-known shape and containing if desired the usual breaker strip, each ply of rubberized fabric being doubled back along its edges and over a wire or wires wound in a comparatively inexpansible ring or coil of a diameter approximating the inner diameter of the finished rubberized fabric and rubber tire outer part as hereinafter described and claimed.

In the drawings Figure 1 is a transverse section of a tire constructed in accordance with my invention; Fig. 2 is a top plan view of a portion of the rubber tread showing one form of anti-skid surface; Fig. 3 is a coil of wire having five windings, the ends of the coil being connected; Fig. 4 is a detail view showing the joining of the ends of the wire.

14, 15, 16, 17 and 18 are plies of rubberized fabric suitably prepared for tire structure.

19, 20, 21, 22 and 23 are comparatively inexpansible rings or coils composed of one or more strands or windings of wire or wires, units, each consisting of five windings of a single wire, being shown in the present instance, the ends of each unit of wire being spliced together.

24, 25, 26, 27 and 28 are the edges of the respective plies of fabric which are folded outwardly and are each increased in width from the inner folded edge to the outer folded edge and compacted together providing squared dovetail shaped beads or packs.

29 is the usual breaker strip embedded in the rubber sheath 30, the tread of which has therein or thereon the anti-skid or anti-friction wearing surface, comprising the circumferential rib 31, the diagonal projections 32 and the diagonal grooves 33 between the projections 32. These are the elements of the rubberized fabric and rubber outer part of my improved tire.

The inner metal part of my tire comprises a substantially U shaped demountable metal "rim" 34, having a deep peripheral circumferential channel provided with L shaped retaining beads or flanges at each edge, providing flat tables or shelves upon which may rest the flat inner circumferential edges of the rubberized fabric and rubber outer part of the tire, the retaining beads or flanges comprising annular parts 35 and 36, the part 35 extending in an axial direction and also extending slightly outward, thus enlarging in circumference toward its outer end adjacent the part 36. The part 36 extends radially and is inclined slightly inward toward the central plane of the tire. Together, the parts 35 and 36 form clencher edges to receive the edges of the outer part of the tire when the inner tube is inserted and inflated as aforesaid. The precise form of U shaped part is immaterial, providing the interior side surfaces will receive the outer part edges properly. Within the two parts the usual inflatable inner tube is employed.

Having thus described my invention the following is what I claim as new therein and desire to secure by Letters Patent:

1. A tire structure comprising a series of plies of fabric; each ply having its edges doubled upon and laid against the body of the ply providing a fold and a metallic ring located in the pocket of the fold, the folds of the plies increasing in width from the inner fold to the outer fold.

2. A tire structure comprising a series of plies of fabric; each ply having its edges doubled upon and laid against the body of the ply providing a fold and a metallic ring located in the pocket of the fold, the folds of the plies increasing in width from the first fold to the last fold forming beads or packs.

3. A tire structure comprising a series of plies of fabric; each ply having its edges doubled upon and laid against the body of the ply providing a fold and a metallic ring located in the pocket of the fold, the folds of the plies increasing in width from the first fold to the last fold forming beads or packs of squared dovetail shape.

MARK A. DEES.

Witnesses:
 WALTER ALLEN,
 WALTER E. ALLEN.